United States Patent Office 3,801,597
Patented Apr. 2, 1974

3,801,597
2,3-DIHYDRO-4H-THIENO[3,2-c]
[1]BENZOPYRAN-4-ONES
Yasuo Makisumi, 5–17, 2-chome, Midoridai,
Kawanishi, Hyogo, Japan
No Drawing. Filed May 9, 1972, Ser. No. 251,720
Claims priority, application Japan, May 31, 1971,
46/37,616
Int. Cl. A61k 27/00; C07d 63/08
U.S. Cl. 260—332.2 H                    11 Claims

ABSTRACT OF THE DISCLOSURE 2,3-dihydro - 4H - thieno[3,2-c][1]benzopyran-4-ones synthesized from 4-allylthiocoumarins, 3-allyl-4-mercapto (or acylmercapto)-coumarins, 3-allyl-4-halogenocoumarins or 3-(2-halogenoethyl)-4-halogenocoumarins showing strong antipyretic and analgesic activities with low toxicity.

---

This invention relates to novel coumarin derivatives having thiophene ring. Further, it relates to processes for their preparation.

The said coumarin derivatives may be represented by the following formula:

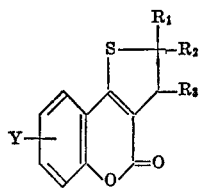

[I]

wherein $R_1$, $R_2$ and $R_3$ each is a hydrogen atom or a lower alkyl group (e.g. methyl, ethyl, propyl, butyl) and Y is a hydrogen atom or one or two substituents selected from the group consisting of halogen atoms (e.g. chlorine, bromine, iodine), lower alkyl groups (e.g. methyl, ethyl, propyl, butyl) and lower alkoxy groups (e.g. methoxy, ethoxy, propoxy, butoxy).

The said coumarin derivatives of the Formula I are novel and have been discovered to show strong analgesic and antipyretic activities.

Accordingly, a basic object of this invention is to provide novel coumarin derivatives of the Formula I. More precisely, it is to provide 2,3-dihydro-4H-thieno[3,2-c] [1]benzopyran-4-ones. Another object of the invention is to provide coumarin derivatives showing strong analgesic and antipyretic activities with low toxicity. A further object of the invention is to provide processes for preparing the novel coumarin derivatives. These and other objects and the manners in which they are accomplished will become apparent to those conversant with the art from the following descriptions.

The novel coumarin derivatives of the Formula I may be prepared in various ways of which the general aspect may be illustrated by the following scheme:

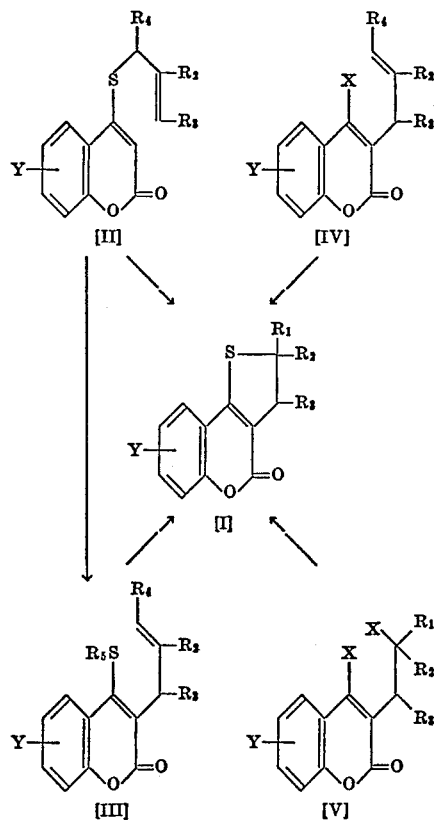

wherein $R_1$, $R_2$, $R_3$ and Y each has the same significance as designated above, $R_4$ is a hydrogen atom or a lower alkyl group having the relationship to $R_1$ as $R_1=CH_2-R_4$, $R_5$ is a hydrogen atom or an acyl group (e.g. acetyl, propionyl, butyryl, benzoyl) and X is a halogen atom (e.g. chlorine, bromine, iodine).

As illustrative of the objective Compound I are:

2-methyl-2,3-dihydro-4H-thieno[3,2-c][1]benzopyran-4-one,
2,3-dimethyl-2,3-dihydro-4H-thieno[3,2-c][1]benzopyran-4-one,
2,2-dimethyl-2,3-dihydro-4H-thieno[3,2-c][1]benzopyran-4-one,
2-methyl-7-chloro-2,3-dihydro-4H-thieno[3,2-c][1]benzopyran-4-one,
2-methyl-8-chloro-2,3-dihydro-4H-thieno[3,2-c][1]benzopyran-4-one,
2,8-dimethyl-2,3-dihydro-4H-thieno[3,2-c][1]benzopyran-4-one,
2-methyl-7-methoxy-2,3-dihydro-4H-thieno[3,2-c][1]benzopyran-4-one,
2-methyl-8-methoxy-2,3-dihydro-4H-thieno[3,2-c][1]benzopyran-4-one, 2,6,8-trimethyl-2,3-dihydro-4H-thieno[3,2-c][1]benzopyran-4-one,
2,3-dihydro-4H-thieno[3,2-c][1]benzopyran-4-one,
6-bromo-2,3-dihydro-4H-thieno[3,2-c][1]benzopyran-4-one,
2-propyl-3,6-dimethyl-2,3-dihydro-4H-thieno[3,2-c][1]benzopyran-4-one,
2-methyl-7,8-dibromo-2,3-dihydro-4H-thieno[3,2-c][1]benzopyran-4-one,
2-ethyl-2,3-dihydro-4H-thieno[3,2-c][1]benzopyran-4-one,
2-propyl-6-methoxy-7-chloro-2,3-dihydro-4H-thieno[3,2-c][1]benzopyran-4-one,
2,3-dimethyl-8-iodo-2,3-dihydro-4H-thieno[3,2-c][1]benzopyran-4-one,
2,7-dimethyl-3-ethyl-8-methoxy-2,3-dihydro-4H-thieno[3,2-c][1]benzopyran-4-one,
2-butyl-8-iodo-2,3-dihydro-4H-thieno[3,2-c][1]benzopyran-4-one,
2,3-diethyl-9-chloro-2,3-dihydro-4H-thieno[3,2-c][1]benzopyran-4-one,
2,2,3-trimethyl-2,3-dihydro-4H-thieno[3,2-c][1]benzopyran-4-one,
2-methyl-8-propyl-2,3-dihydro-4H-thieno[3,2-][1]benzopyran-4-one,
2-methyl-6-ethyl-8-bromo-2,3-dihydro-4H-thieno[3,2-c][1]benzopyran-4-one,
8-methyl-2,3-dihydro-4H-thieno[3,2-c][1]benzopyran-4-one, and
2-methyl-8-butoxy-2,3-dihydro-4H-thieno[3,2-c][1]benzopyran-4-one.

According to the present invention, the compounds of the Formula I can be produced by some different methods, which are illustrated in detail below, respectively.

(a) Preparation from 4-allylthiocoumarin [II].

The gist of this preparation may be illustrated as follows:

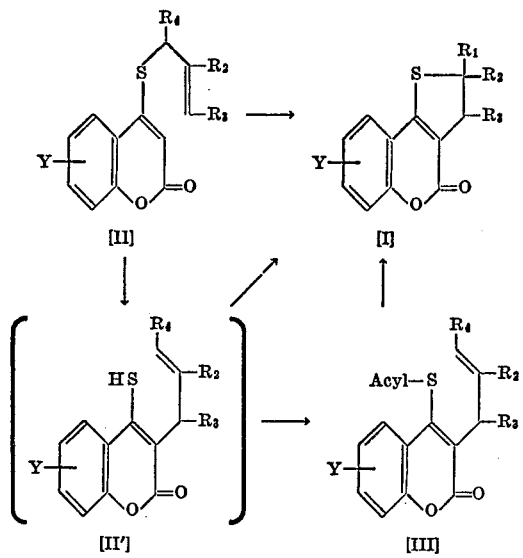

wherein $R_1$, $R_2$, $R_3$, $R_4$ and Y each has the same significance as designated above.

2,3-dihydro-4H-thieno[3,2-c][1]benzopyran - 4 - ones [I] can be prepared merely by heating corresponding 4-allythiocoumarins. Generally, the reaction may be executed at a temperature ranging from about 50 to about 300° C. for about 0.5 to about 60 hours under ordinary (atmospheric) pressure, while the reaction conditions may be varied depending on the properties of the starting compounds. The reaction solvent is not necessarily required, but may be selected from, for example, organic acids (e.g. acetic acid, propionic acid), aromatic hydrocarbons (e.g. benzene, toluene, xylene), amines (e.g. pyridine, triethylamine, dimethylaniline), dimethylformamide, dimethyl-sulfoxide and the like. They can be employed solely or as a mixture in consideration of the solubility of the starting compounds as well as other reaction conditions employed. Since oxygen and light unfavourably affect the present reaction, it is generally recommended to carry out the reaction in an inert atmosphere such as nitrogen, argon and the like and in dark, if necessary.

The present reaction proceeds through unstable intermediate [II'] which can be trapped as an acylate [III] by action of an acid anhydride. The acyl intermediates [III], i.e. 3-allyl - 4 - acylthiocoumarins, are converted to 2,3-dihydro-4H-thieno[3,2-c][1]benzopyran - 4-ones by an acid treatment. An alkaline hydrolysis results in 3-allyl-4-mercaptocoumarins, but the latter are so unstable as to be easily converted to the objective compounds of the Formula [I], especially by an acid treatment. Therefore, the reaction may be performed stepwise via the acylmercapto intermediates [III]. For this purpose, it can be carried out in a similar manner as mentioned above except that an acid anhydride is added to the reactants. The acid anhydride may be added to the starting materials prior to the reaction, and acetic anhydride is used usually as a favorable acid anhydride. Generally, this stepwise method is favored, because the by-product is less than that of the aforementioned one step method.

The starting Compound [II] can be prepared by condensation of a corresponding 4-mercaptocoumarin with an allyl halide in the presence of a basic substance such as an alkali metal alcoholate or an alkali metal carbonate.

(b) Preparation from 3-allyl - 4 - halogenocoumarin [IV].

2,3-dihydro-4H-thieno[3,2-c][1]benzopyran - 4 - ones [I] can be also prepared from corresponding 3-allyl-4-halogenocoumarins[IV]. The reaction is executed by heating the 3-allyl-4-halogenocoumarins of the Formula IV at the temperature ranging from about 50° C. to about 300° C. in the presence of a mercapto group introducing agent such as thiourea, alkali metal sulfides (e.g. sodium sulfide, potassium sulfide) and alkali metal hydrogen sulfides (e.g. sodium hydrogen sulfide, potassium hydrogen sulfide). The reaction solvent may be selected from inert solvents including water, methanol, ethanol, propanol, butanol, amyl alcohol, ethylene glycol, propylene glycol, nitrobenzene, xylene, naphthalene, methylnaphthalene, dimethylaniline, quinoline, collidine and the like. Especially, a solvent having a high boiling point is preferred.

The starting compound, 3-allyl-4-halogenocoumarin [IV] can be prepared, for example, by treating a corresponding 4-hydroxy compound with phosphorus oxyhalide.

(c) Preparation from 3-(2-halogenoethyl)-4-halogenocoumarin[V]

The compounds of the Formula V, 3-(2-halogenoethyl)-4-halogenocoumarins can be converted to the objective compounds, 2,3-dihydro-4H-thieno[3,2-c][1]benzopyran-4-ones[I]. The reaction may be carried out in the same manner as described in the previous method (b). That is, the Compound V is heated in an inert solvent in the presence of mercapto group introducing agent at a temperature ranging from about 50° C. to about 300° C. The mercapto group introducing agent and reaction solvent to be employed are the same as those employed in the method (b).

The starting compound, 3-(2-halogenoethyl)-4-halogenocoumarin[V] can be prepared, for example, by treating a corresponding 3-allyl-4-hydroxycoumarin with phosphorus oxyhalide.

The presence of substituent(s) at 2 and/or 3 position(s) of 2,3-dihydro-4H-thieno[3,2-c][1]benzopyran - 4 - ones results in various steric isomers. These diastereomers and optical isomers may be separated, for example, by chromatography, recrystallization and other conventional methods for optical resolution, if necessary.

The thus prepared 2,3-dihydro-4H-thieno[3,2-c][1]benzopyran-4-ones are useful as antipyretic and analgesic agents. For example, the animal test data of 2-methyl-2,3- dihydro-4H-thieno[3,2-c][1]benzopyran-4-one are shown in the following Table 1 and Table 2 in contrast with commercially available and popular agents, i.e. aminopyrine and phenylbutazone.

TABLE 1.—TOXICITY AND ANTIPYRETIC ACTIVITY

| Test compound | Toxicity [1] $LD_{50}$ (mg./kg.) | Antipyretic activity [2] | | | |
|---|---|---|---|---|---|
| | | Dose (mg.) | 30′ | 60′ | 120′ |
| 2-methyl-2,3-dihydro-4H-thieno[3,2-c][1]-benzopyran-4-one | 1,809 | 25 | −3.85 | −4.39 | −0.47 |
| | | 50 | −4.86 | −5.44 | −2.47 |
| Aminopyrine | 819 | 100 | −2.14 | −1.23 | −0.25 |
| | | 250 | −3.11 | −3.55 | −1.19 |
| Phenylbutazone | 1,255 | 200 | −0.14 | +0.04 | −0.20 |

[1] Toxicity: DS male mice weighing 18 to 22 grams were orally mediated with various doses of the test compounds, and were observed for 72 hours. The $LD_{50}$, the dose which is lethal to 50% treated animal, was calculated by the Up and Down method.

[2] Antipyretic activity: DS male mice weighing 17 to 20 grams were accustomed to a cage in an air-conditioned room (22–25° C.) for 1 hour before the experiment and treated orally with various doses of the test compounds. Fall of body temperature was measured by inserting a thermocouple electrode into the rectum.

TABLE 2.—ANALGESIC ACTIVITY

| Test compound | Acetic acid [1] $ED_{50}$ (mg./kg.) | | Phenylquinone [2] $ED_{50}$ (mg./kg.) | |
|---|---|---|---|---|
| | 30′ | 60′ | 30′ | 60′ |
| 2-methyl-2,3-dihydro-4H-thieno[3,2-c][1]-benzopyran-4-one | 22 | 17 | 27 | 38 |
| Aminopyrine | 45 | 48 | 98 | 107 |
| Phenylbutazone | 290 | 430 | 425 | 385 |

[1] Analgesic activity (acetic acid): DS male mice weighing 20 to 23 grams were used. The mouse was treated by an intraperitoneal injection of 0.1 ml./10 g. acetic acid as a writhing inducer and placed in an individual observation cage for 15 minutes after the treatment. In the control animal the writhing sydnrome occurred about 30 times during this period. The dose reducing the number of writhes to one-half was determined and the $ED_{50}$ was calculated by the probit method.

[2] Analgesic activity (phenylquinone): DS mice weighing 15 to 17 grams were used. The mouse was treated by an intraperitoneal injection of 0.2 ml./10 g. of 0.02% 2-phenyl-1,4-benzoquinone solution as a writhing inducer and placed in an individual observation cage for 15 minutes after the treatment. In the control animal the writhing syndrome occurred about 10 times during this period. When the mouse treated by a test compound did not show this syndrome for 15 minutes period, the test compound was judged to have an analgesic activity. The $ED_{50}$ was calculated by the Up and Down method of Brownlee.

The other 2,3 - dihydro - 4H - thieno[3,2-c][1]benzopyran-4-ones provided by the present invention also showed similarly excellent pharmacological properties. Accordingly, the compounds of the Formula I are useful as antipyretic and analgesic agents of a low toxicity, which can be administered in dosage unit form, as carried by a suitable pharmaceutical carrier, to human beings particularly for relieving from fever and plain.

The following examples are given solely for the purpose of illustration and not to be construed as limitation of this invention, many variations of which are possible.

EXAMPLE 1

A solution of 4-allylthiocoumarin (1 g.) in dimethylaniline (3 ml.) is heated at 150° C. for 3 hours under argon atmosphere. Upon cooling, the reaction mixture is dissolved in ether and the solution is shaken with dilute hydrochloric acid to remove the dimethylaniline. The ether layer is washed with water and dried over magnesium sulfate. After removal of the ether by evaporation, the residue is chromatographed on alumina. The petroleum ether-benzene (9:1–4:1) fractions are evaporated to give 2-methyl-2,3-dihydro-4H-thieno[3,2-c][1]benzopyran-4-one (614 mg.). Recrystallization from petroleum benzine gives colorless columns, M.P. 83.5–84.5° C.

Analysis.—Calcd. for $C_{12}H_{10}O_2S$ (percent): C, 66.03; H, 4.62; S, 14.69. Found (percent): C, 66.23; H, 4.63; S, 14.53.

Preparation of 4-allylthiocoumarin: In a solution of sodium ethylate from sodium (760 mg.) in anhydrous ethanol (60 ml.), 4-mercaptocoumarin (5.34 g.) is dissolved and allyl bromide (4 g.) is dropwise added to the solution under cooling. After stirring for 5 hours, the mixture is filtered. The filtrate is concentrated under reduced pressure and dissolved in ether. Evaporation of the ether gives crude crystals (5.61 g.). Recrystallization from benzene-petroleum benzine gives colorless needles, M.P. 133–133.5° C.

Analysis.—Calcd. for $C_{12}H_{10}O_2S$ (percent): C, 66.03; H, 4.62; S, 14.69. Found (percent): C, 66.31; H, 4.68; S, 14.42.

EXAMPLE 2

Under argon atmosphere, 4-allylthiocoumarin (1 g.) is heated at 200° C. for 2 hours. The reaction mixture is dissolved in a mixture of benzene-petroleum ether and the solution is treated in the same manner to Example 1 to give 2-methyl-2,3-dihydro-4H-thieno[3,2-c][1]benzopyran-4-one (474 mg.).

EXAMPLE 3

A solution of 4-methallylthiocoumarin (2 g.) in dimethylaniline (6 ml.) is heated at 150° C. for 3 hours under argon atmosphere. After the solvent is evaporated under reduced pressure, the residue is dissolved in ether. The ether solution is shaken with dilute hydrochloric acid and water, and dried over magnesium sulfate. After removal of the ether, the residue is chromatographed on alumina. The petroleum ether-benzene (9:1–4:1) fractions are evaporated to give 2,2-dimethyl-2,3-dihydro-4H-thieno[3,2-c][1]benzopyran-4-one (870 mg.). Recrystallization from petroleum benzine gives colorless columns, M.P. 99.5–100.5° C.

Analysis.—Calcd. for $C_{13}H_{12}O_2S$ (percent): C, 67.22; H, 5.21; S, 13.80. Found (percent): C, 67.06; H, 4.95; S, 13.71.

Preparation of 4-methallylthiocoumarin: Crude product (2.65 g.) is obtained by the reaction of 4-mercaptocoumarin (2.67 g.) with methallyl chloride (1.5 g.) in the same manner to the preparation of 4-allylthiocoumarin in Example 1. Recrystallization from benzene gives colorless prisms, M.P. 118–119° C.

Analysis.—Calcd. for $C_{13}H_{12}O_2S$ (percent): C, 67.22; H, 5.21; S, 13.80. Found (percent): C, 67.38; H, 5.29; S, 14.00.

EXAMPLE 4

A solution of 4-crotylthiocoumarin (2 g.) in dimethylaniline (6 ml.) is heated at 150° C. for 3 hours under argon atmosphere. The reaction mixture is treated in the same manner to Example 3 to give one isomer (diastereomer) of 2,3-dimethyl-2,3-dihydro-4H-thieno[3,2-c][1]benzopyran-4-one (800 mg.). Recrystallization from petroleum benzine gives colorless needles, M.P. 80.5–81° C.

Analysis.—Calcd. for $C_{13}H_{12}O_2S$ (percent): C, 67.22; H, 5.21; S, 13.80. Found (percent): C, 67.14; H, 4.95; S, 13.64.

The following petroleum ether-benzene fractions give another isomer of 2,3-dimethyl-2,3-dihydro-4H-thieno-[3,2-c][1]benzopyran-4-one (780 mg.). Recrystallization from petroleum benzine gives colorless plates, M.P. 95–97° C.

Analysis.—Calcd. for $C_{13}H_{12}O_2S$ (percent): C, 67.22; H, 5.21; S, 13.80. Found (percent): C, 67.48; H, 5.17; S, 13.77.

Preparation of 4-crotylcoumarin: Crude product (5.32 g.) is obtained by the reaction of 4-mercaptocoumarin (5.34 g.) with crotyl chloride (2.99 g.) in the same manner to the preparation of 4-allylthiocoumarin in Example 1. Recrystallization from benzene-petroleum benzine gives colorless needles, M.P. 107.5–109° C.

Analysis.—Calcd. for $C_{13}H_{12}O_2S$ (percent): C, 67.22; H, 5.21; S, 13.80. Found (percent): C, 67.13; H, 5.22; S, 13.56.

EXAMPLE 5

Under argon atmosphere, 4-crotylthiocoumarin (1 g.) is heated at 200° C. for 3 hours. The reaction mixture is treated in the same manner to Example 4 to give one isomer (diastereomer) of 2,3-dimethyl-2,3-dihydro-4H-thieno[3,2-c][1]benzopyran-4-one (412 mg.) and another isomer (390 mg.).

EXAMPLES 6-9

The products listed below can be prepared by substantially the same procedure to Example 1 from the corresponding starting compounds.

neutralized with 10% acetic acid to precipitate 3-(α-methylallyl)-4-mercaptocoumarin as white crystals. After standing at room temperature overnight, the precipitate is chromatographed on alumina to give 2,3-dimethyl-2,3-dihydro-4H-thieno[3,2-c][1]benzopyran-4-one.

EXAMPLES 12-14

The products listed below can be prepared by sub-

| Ex. No. | Starting compound | Product | Properties of product |
|---|---|---|---|
| 6 | 4-allylthio-6-methylcoumarin. M.P. 89–90° C., colorless needles. | 2,8-dimethyl-2,3-dihydro-4H-thieno-[3,2-c][1]benzopyran-4-one. | M.P. 93–93.5, colorless needles from acetone-hexane. Analysis.—Calcd. for $C_{13}H_{12}O_2S$: C, 67.22; H, 5.21; S, 13.80. Found: C, 67.12; H, 5.36; S, 13.88. |
| 7 | 4-allylthio-6-chlorocoumarin. M.P. 130–131° C., colorless needles. | 2-methyl-8-chloro-2,3-dihydro-4H-thieno[3,2-c][1]benzopyran-4-one. | M.P. 116–118° C., colorless columns from acetone-hepane. Analysis.—Calcd. for $C_{12}H_9O_2ClS$: C, 57.03; H, 3.59; Cl, 14.03; S, 12.69. Found: C, 57.18; H, 3.56; Cl, 13.92; S, 12.66. |
| 8 | 4-allylthio-6,8-dimethylcoumarin. M.P. 125–126° C., colorless scales. | 2,6,8-trimethyl-2,3-dihydro-4H-thieno-[3,2-c][1]benzopyran-4-one. | M.P. 133–134° C., colorless columns from acetone-hexane. Analysis.—Calcd. for $C_{14}H_{14}O_2S$: C, 68.26; H, 5.73; S, 13.02. Found: C, 68.39; H, 5.79; S 12.93. |
| 9 | 4-allylthio-7-methoxycoumarin. M.P. 107–108° C., colorless needles. | 2-methyl-7-methoxy-2,3-dihydro-4H-thieno[3,2-c][1]benzopyran-4-one. | M.P. 135–136° C., colorless columns from acetone-hexane. Analysis.—Calcd. for $C_{13}H_{12}O_3S$: C, 62.88; H, 4.87; S, 12.91. Found: C, 62.99; H, 4.89; S, 12.90. |

EXAMPLE 10

A solution of 4-allylthiocoumarin (1 g.) in acetic anhydride (2 ml.) is heated at 150° C. for 6 hours under stantially the same procedure to Example 10 from the corresponding starting compounds through the acetylthio intermediates.

| Ex. No. | Starting compound | Acetylthio Intermediate | Product |
|---|---|---|---|
| 12 | 4-allylthio-6-methylcoumarin | 3-allyl-4-acetylthio-6-methylcoumarin, M.P. 119–121° C., colorless prisms. Analysis.—Calcd. for $C_{15}H_{14}O_3S$: C, 65.67; H, 5.14; S, 11.69. Found: C, 65.82; H, 5.14; S, 11.73. | 2,8-dimethyl-2,3-dihydro-4H-thieno-[3,2-c][1]benzopyran-4-one. |
| 13 | 4-allylthio-6,8-dimethylcoumarin | 3-allyl-4-acetylthio-6,8-dimethylcoumarin, M.P. 129–129.5° C., colorless plates. Analysis.—Calcd. for $C_{16}H_{16}O_3S$: C, 66.64; H, 5.59; S, 11.12. Found: C, 66.58; H, 5.64; S, 11.18. | 2,6,8-trimethyl-2,3-dihydro-4H-thieno[3,2-c][1] benzopyran-4-one. |
| 14 | 4-allylthio-7-methoxycoumarin | 3-allyl-4-acetylthio-7-methoxycoumarin, M.P. 98–99° C., colorless columns. Analysis.—Calcd. for $C_{15}H_{14}O_4S$: C, 62.05; H, 4.86; S, 11.04. Found: C, 62.12; H, 4.88; S, 11.06. | 2-methyl-7-methoxy-2,3-dihydro-4H-thieno[3,2-c][1]benzopyran-4-one. | argon atmosphere. After the reaction, the acetic anhydride is removed by evaporation under reduced pressure. To a solution of the resultant residue, 3-allyl-4-acetylthiocoumarin, in acetic acid (10 ml.) is added 47% aqueous hydrogen bromide (7 ml.) and the mixture is heated at 100° C. for 1.5 hours and concentrated under reduced pressure. The residue is chromatographed on silica gel. The benzene eluate is evaporated to give 2-methyl-2,3 - dihydro-4H - thieno[3,2-c][1]benzopyran-4-one (900 mg.).

On the other hand, to a solution of 3-allyl-4-acetylthiocoumarin (2 g.) obtained above in methanol (60 ml.) is added 10% sodium carbonate (10 ml.) and the mixture is stirred for 3 hours. The reaction mixture is filtered and the filtrate is neutralized with dilute hydrochloric acid to precipitate 3-allyl-4-mercaptocoumarin. Upon standing at room temperature overnight, the precipitate is chromatographed on alumina. The petroleum ether-benzene (9:1–4:1) fractions are evaporated to give 2-methyl-2,3-dihydro-4H - thieno[3,2-c][1]benzopyran-4-one (270 mg.).

EXAMPLE 11

When 4-crotylthiocoumarin (1 g.) is treated by the same procedure to Example 10, 3-(α-methylallyl)-4-acetylthiocoumarin is obtained. By a further treatment in the same manner to Example 10, a mixture of cis and trans isomers of 2,3-dimethyl-2,3-dihydro-4H-thieno [3,2-c][1]benzopyran-4-one (920 mg.) is obtained from benzene and benzene-chloroform (10:1) fractions.

On the other hand, to a solution 3-(α-methylallyl)-4-acetylthiocoumarin (1 g.) obtained above in methanol (30 ml.) is added 10% sodium carbonate (6 ml.) and the mixture is stirred for 2 hours. After removal of the solvent by evaporation under reduced pressure, the residue is dissolved in water and filtered. The filtrate is

EXAMPLE 15

[A] To a solution of sodium hydrogen sulfide prepared by passing hydrogen sulfide through a solution of sodium (46 mg.) in anhydrous ethanol (9 ml.) under cooling, 3-allyl-4-chlorocoumarin (221 mg.) is added. The mixture is heated at 40° C. for 30 minutes and further refluxed for 2 hours. After cooling, the precipitate is removed by filtration and the filtrate is evaporated. To the residue, water is added and extracted with chloroform. The extract is washed with water, dried over magnesium sulfate and evaporated under reduced pressure. The residue is chromatographed on alumina and eluted with benzene. Evaporation of the benzene eluate gives crude 2-methyl-2,3-dihydro-4H - thieno[3,2-c][1]benzopyran-4-one (190 mg.). Recrystallization from petroleum benzine gives colorless columns, M.P. 85–86° C.

[B] A solution of 3-allyl-4-chlorocoumarin (220 mg.) and sodium sulfide ($Na_2S \cdot 9H_2O$) (360 mg.) in ethanol (10 ml.) is refluxed on a water bath for 3 hours. After cooling, the precipitate is removed by filtration and the filtrate is evaporated under reduced pressure. To the residue is added water and washed with chloroform several times. The aqueous layer is treated with active carbon, acidified with acetic acid, and extracted with chloroform. The chloroform extract is washed with water, dried over magnesium sulfate and evaporated. The residue is chromatographed on alumina. From the benzene eluate, crude 2-methyl-2,3-dihydro-4H-thieno[3,2-c][1]benzopyran-4-one (87 mg.) is obtained.

[C] A solution of 3-allyl-4-chlorocoumarin (210 mg.) and thiourea (110 mg.) in ethylene glycol (10 ml.) is heated at 170° C. for 4 hours. After the solvent is removed by evaporation, the residue is diluted with water. The solution is made alkaline with sodium hydroxide and extracted with chloroform. The chloroform extract is washed with water, dried over magnesium sulfate and evaporated. The resultant residue is chromatographed on alumina. From benzene eluate, crude 2-methyl-2,3-dihydro-4H-thieno[3,2-c][1]benzopyran-4-one (132 mg.) is obtained.

Preparation of 3-allyl-4-chlorocoumarin: A mixture of 3-allyl-4-hydroxycoumarin (200 mg.), phosphorus oxychloride (400 mg.) and N,N-dimethylaniline (100 mg.) is heated at 120° C. for 1 hour. After addition of aqueous solution of disodium hydrogen phosphate to the reaction mixture under cooling, the solution is made alkaline and extracted with chloroform. The chloroform extract is washed with hydrochloric acid and water, dried over magnesium sulfate and evaporated. The residue is chromatographed on alumina. Crude product is obtained from the benzene eluate. Recrystallization from n-hexane gives crystals melting at 51.5–53° C.

*Analysis.*—Calcd. for $C_{12}H_9O_2Cl$ (percent): C, 65.32; H, 4.11; Cl, 16.07. Found (percent): C, 65.24; H, 4.10; Cl, 16.22.

EXAMPLE 16

[A] In the same manner to Example 15 [A], 3-(2-chloropropyl)-4-chlorocoumarin (257 mg.) is treated to give 2 - methyl-2,3-dihydro-4H-thieno[3,2-c][1]benzopyran-4-one (173 mg.), M.P. 85.5–86° C.

[B] A solution of 3-(2-chloropropyl)-4-chlorocoumarin (257 mg.) and sodium sulfide ($Na_2S \cdot 9H_2O$) (360 mg.) in ethanol (10 ml.) is refluxed on a water bath for 3 hours. After cooling, the precipitate is removed by filtration and the filtrate is evaporated. To the residue is added water and extracted with chloroform. The chloroform extract is washed with water, dried over magnesium sulfate and evaporated. The resultant residue is chromatographed on alumina. Crude 2-methyl-2,3-dihydro-4H-thieno[3,2-c][1]benzopyran-4-one (125 mg.) is obtained by evaporating benzene eluate.

[C] In the same manner to Example 15 [C] 3-(2-chloropropyl)-4-chlorocoumarin (257 mg.) is treated to give crude 2-methyl-2,3-dihydro-4H-thieno[3,2-c][1]benzopyran-4-one (145 mg.).

Preparation of 3-(2-chloropropyl)-4-chlorocoumarin: A mixture of 3-allyl-4-hydroxycoumarin (500 mg.) and phosphorus oxychloride (600 mg.) is heated at 120° C. for 2 hours. The reaction mixture is diluted with water, made alkaline with sodium hydroxide, and extracted with chloroform. The chloroform extract is washed with water, dried over magnesium sulfate and evaporated. The resultant residue is chromatographed on alumina. Crude product (460 mg.) is obtained from benzene eluate. Recrystallization from n-hexane gives colorless scales, M.P. 74.5–75.5° C.

*Analysis.*—Calcd. for $C_{12}H_{10}O_2Cl_2$ (percent): C, 56.06; H, 3.92; Cl, 27.58. Found (percent): C, 56.34; H, 4.19; Cl, 27.72.

EXAMPLE 17

In the same manner to Example 15 [A], 3-(2-chloroethyl)-4-chlorocoumarin (180 mg.) is treated to give 2,3-dihydro-4H-thieno[3,2-c][1]benzopyran-4-one (125 mg.). Recrystallization from benzene-petroleum benzine gives colorless scales, M.P. 134.5–135.5° C.

*Analysis.*—Calcd. for $C_{11}H_8O_2S$ (percent): C, 64.69; H, 3.95; S, 15.70. Found (percent): C, 64.40; H, 3.82; S, 15.62.

Preparation of 3-(2-chloroethyl)-4-chlorocoumarin: Crude product (240 mg.) is obtained by the reaction of 3-(2-hydroxyethyl)-4-hydroxycoumarin (300 mg.) with phosphorus oxychloride (0.9 ml.) in the same manner to the preparation of 3-(2-chloropropyl)-4-chlorocoumarin in Example 16. Recrystallization from n-hexane gives colorless nedles, M.P. 98.5–99.5° C.

*Analysis.*—Calcd. for $C_{11}H_8O_2Cl_2$ (percent): C, 54.35; H, 3.32; Cl, 29.17. Found (percent): C, 54.29; H, 3.45; Cl, 29.36.

What we claimed is:

1. A member selected from the compounds of the formula:

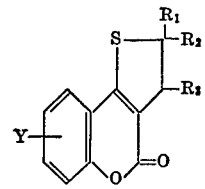

wherein $R_1$, $R_2$, $R_3$ each is a member selected from the group consisting of hydrogen and lower alkyl and Y is hydrogen or one or two substituents selected from the group consisting of halogen, lower alkyl and lower alkoxy.

2. A compound according to claim 1, 2-methyl-2,3-dihydro-4H-thieno[3,2-c][1]benzopyran-4-one.

3. A compound according to claim 1, 2,2-dimethyl-2,3-dihydro-4H-thieno[3,2-c][1]benzopyran-4-one.

4. A compound according to claim 1, 2,3-dimethyl-2,3-dihydro-4H-thieno[3,2-c][1]benzopyran-4-one.

5. A compound according to claim 1, 2-methyl-7-chloro-2,3-dihydro-4H-thieno[3,2-c][1]benzopyran-4-one.

6. A compound according to claim 1, 2-methyl-8-chloro-2,3-dihydro-4H-thieno[3,2-c][1]benzopyran-4-one.

7. A compound according to claim 1, 2-methyl-7-methoxy-2,3-dihydro-4H-thieno[3,2-c][1]benzopyran-4-one.

8. A compound according to claim 1, 2-methyl-8-methoxy-2,3-dihydro-4H-thieno[3,2-c][1]benzopyran-4-one.

9. A compound according to claim 1, 2,8-dimethyl-2,3-dihydro-4H-thieno[3,2-c][1]benzopyran-4-one.

10. A compound according to claim 1, 2,6,8-trimethyl-2,3-dihydro-4H-thieno[3,2-c][1]benzopyran-4-one.

11. A compound according to claim 1, 2,3-dihydro-4H-thieno[3,2-c][1]benzopyran-4-one.

References Cited

FOREIGN PATENTS 2,041,610   3/1971   Germany _____ 260—327

OTHER REFERENCES

Patell, et al.: Jour. Indian Chem. Soc. 44, No. 9, 1967, pp. 747–751.

Burger: Medicinal Chemistry (Interscience, N.Y., 1960), pp. 72–78.

HENRY R. JILES, Primary Examiner

C. M. S. JAISLE, Assistant Examiner

U.S. Cl. X.R.

260—343.2 R; 424—275